W. S. Gitchell,
Cage Trap,
N° 46,557.            Patented Feb. 28, 1865.
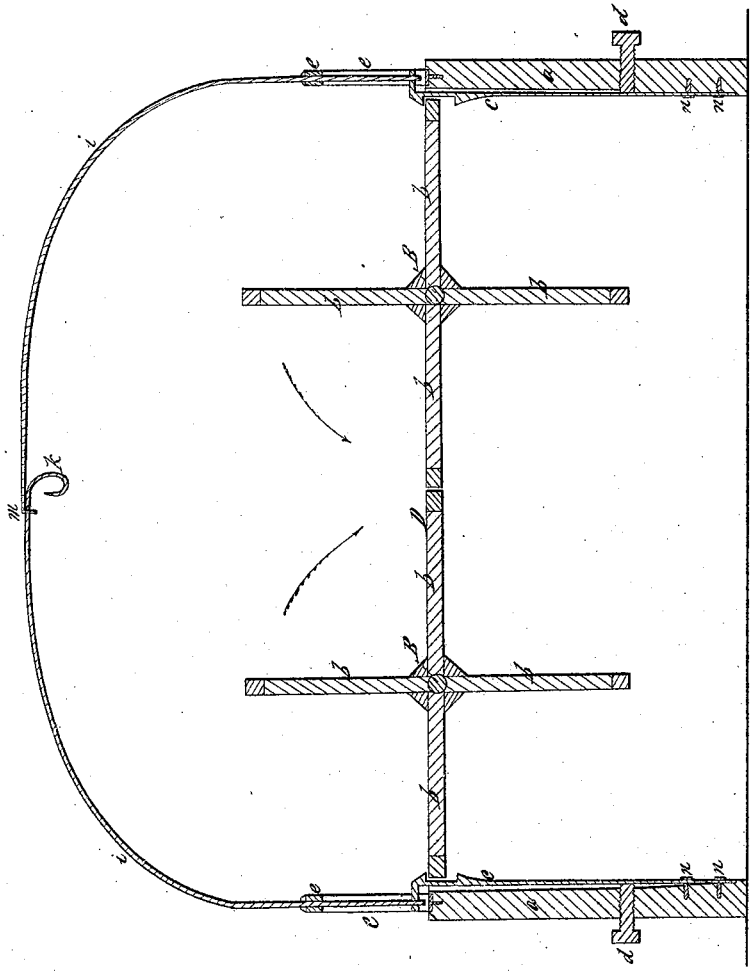
Witnesses:
B. F. James
L. F. Farwell
Inventor:
Willard S. Gitchell
By his Atty W. F. Dennis

UNITED STATES PATENT OFFICE.

WILLARD S. GITCHELL, OF PERU, INDIANA.

IMPROVEMENT IN ANIMAL-TRAPS.

Specification forming part of Letters Patent No. 46,557, dated February 28, 1865.

*To all whom it may concern:*

Be it known that I, WILLARD S. GITCHELL, of Peru, Miami county, Indiana, have invented certain new and useful Improvements in Animal-Traps; and I do hereby declare that the following is a full and exact description of the same, reference being had to the drawing, which accompanies this application, and the letters of reference marked thereon.

The drawing represents a square box, near the upper edge of which two flanged shafts, B B, are hung parallel by pivots. These shafts are each provided with four flanges, $b\ b\ b\ b$, which are uniform.

$c\ c$ are springs, attached to the inner side of the box at the center of its sides, and are provided with notches to receive and retain the flanges $b\ b\ b\ b$. The curved wires $i\ i$ are connected to the springs $c\ c$, and operate them by means of the rock-shafts and frames $e\ e$.

The temper-screws $d\ d$ are intended to govern the pressure upon the spring $c\ c$.

At the junction of the curved wires $i\ i$ one is provided with a loop or eye, through which the other passes, and terminates in a hook, $k$, to which the bait is attached.

To operate this trap it will be seen that the animal in pursuit of the bait enters upon the platform D, and, by a pull upon the hook $k$, releases the flanges from the notches in the springs $c\ c$, when its own weight revolves the shafts B B in the direction indicated by the arrows in the drawing, thus being precipitated into any convenient receptacle below, while the motion given to the shafts by the fall brings up the succeeding flanges into the notches, and the trap is thus again ready set for use.

It will be obvious that the size of the trap can be varied for animals of any size, and that it is always free from any scent or blood of slaughtered victims, and is always ready for use.

Having thus fully described my said improvement, what I claim as new, and wish to secure by Letters Patent, is—

The combination of the two rotating radial platforms $b\ b$, operated by means of the wires $i\ i$, rock-shafts $e\ e$, and spring-triggers $c\ c$, and through the pulling of the bait from one hook, $k$.

WILLARD S. GITCHELL.

Witnesses:
W. T. DENNIS,
A. CAPLE.